United States Patent

Lailach et al.

[11] Patent Number: 6,106,794
[45] Date of Patent: Aug. 22, 2000

[54] PROCESS FOR THE PREPARATION OF SODIUM FLUORIDE

[75] Inventors: Günter Lailach, Krefeld; Andreas Bulan, Langenfeld; Günter Buss, Leverkusen, all of Germany

[73] Assignee: Bayer Aktiengesellschaft, Leverkusen, Germany

[21] Appl. No.: 09/364,601

[22] Filed: Jul. 30, 1999

[30] Foreign Application Priority Data

Aug. 1, 1998 [DE] Germany .................. 198 34 832

[51] Int. Cl.[7] .................................................. C01D 3/02
[52] U.S. Cl. ...................... 423/490; 423/499.1; 23/301
[58] Field of Search ................ 423/490, 499.1; 23/301

[56] References Cited

U.S. PATENT DOCUMENTS 3,660,019  5/1972  Predikant et al. .
5,470,559  11/1995  Grolman et al. .
5,531,975  7/1996  Erickson et al. .

FOREIGN PATENT DOCUMENTS 220 587    4/1985    Germany .
71-003253  of 1971   Japan .
575270     2/1946    United Kingdom .

OTHER PUBLICATIONS

Remy, Lehrbuch der Anor. Chem. [Textbook of Inorganic Chemistry] vol. 1, 11th edition, Leipzig (month unavailable) 1960, pp. 933–934 Halogenide: Allegmeines.—Fluoride.

*Primary Examiner*—Tom Dunn
*Assistant Examiner*—Christina Ildebrando
*Attorney, Agent, or Firm*—Joseph C. Gil; Diderico van Eyl

[57] ABSTRACT

Process for the preparation of sodium fluoride from sodium hydroxide solution and hydrogen fluoride, characterized in that at least 45% strength by weight, in particular 50% strength by weight, sodium hydroxide solution and anhydrous hydrogen fluoride are introduced separately into a saturated NaF solution in which 4 to 50% by weight, preferably 5 to 30% by weight, solid NaF are suspended and the temperature of which is in the range from 20 to 80° C., preferably 30 to 60° C.

7 Claims, 1 Drawing Sheet

PROCESS FOR THE PREPARATION OF SODIUM FLUORIDE

The invention relates to a process for the continuous preparation of sodium fluoride from sodium hydroxide solution and hydrogen fluoride.

It is known to prepare sodium fluoride by reacting sodium carbonate or sodium hydroxide with hydrofluoric acid. In this reaction, separating off the solid NaF from the mother liquor comprising from 4 to 5% by weight NaF in dissolved form can be improved by adding alcohol (Ullmann's Encyclopaedia of Ind. Chem., 5th Ed., 1997, Wiley VCH, Weinheim). According to Remy, Lehrbuch der Anorg. Chem. [Textbook of Inorganic Chemistry] volume 1, 11th Edition, Leipzig, 1960, p. 933, on the introduction of hydrogen fluoride into dilute sodium hydroxide solution or sodium carbonate solution, NaF precipitates out as a white precipitate.

The industrial preparation is preferably performed from the less costly raw materials cryolite (Remy) or hexafluorosilicic acid (JP-A 71.03253, DD-A 220 587).

For the production of pure sodium fluoride, as is required, for example, for the production of pharmaceutical preparations or toothpaste, or for adding to drinking water, sodium hydroxide solution and hydrogen fluoride purified by distillation are particularly suitable. If these reaction partners are brought to react with one another in dilute form according to the prior art, considerable amounts of mother liquor containing 4 to 5% by weight dissolved in NaF are produced, the work up of which greatly impairs the economic efficiency of the NaF production. If, in contrast, 50% strength by weight sodium hydroxide solution is reacted directly with anhydrous hydrogen fluoride, the reaction mixture heats up to approximately 100° C. owing to the highly exothermic reaction. So much water is evaporated that the high-solids mixture can only be homogenized with extreme difficulty. The hydrogen fluoride introduced, owing to bubble formation, partially escapes from the mixture and leads to corrosion problems and waste gas problems. The corrosivity of both reaction partners at the high reaction temperature requires expensive plant.

It is the object of the invention to provide a process for the inexpensive preparation of pure NaF from sodium hydroxide solution and hydrogen fluoride, avoiding the problems described.

According to the invention, NaF is prepared by separately introducing 50% strength by weight sodium hydroxide solution and anhydrous HF into a saturated NaF solution which comprises 4 to 50% by weight of solid suspended NaF at 20 to 80° C.

The invention relates to a process for the preparation of sodium fluoride from sodium hydroxide solution and hydrogen fluoride, characterized in that at least 45% strength by weight, in particular 50% strength by weight, sodium hydroxide solution and anhydrous hydrogen fluoride are introduced separately into a saturated NaF solution in which 4 to 50% by weight, preferably 5 to 30% by weight, solid NaF are suspended and the temperature of which is in the range from 20 to 80° C., preferably 30 to 60° C.

To maintain a preferably constant reaction temperature, preferably under vacuum, water is evaporated from the reaction mixture. The reaction can be carried out in a stirred tank or, preferably, in a forced-circulation evaporator according to FIG. 1. From the reactor suspension is taken off, preferably continuously, for separating off the NaF formed.

The NaF separation can be carried out by filtration or centrifugation. The mother liquor arising in this operation is preferably recirculated in the reactor. The moisture content of the NaF separated off is preferably set at approximately 15% by weight, so that the mother liquor volume remains constant in the plant. The moist NaF can be dried in a suitable dryer, for example a spin flash dryer, pneumatic dryer, fluidized-bed dryer or a contact dryer.

Surprisingly, it has been found that when a forced-circulation evaporator is used as reactor, at a given plant capacity, the particle size of the NaF produced can be varied within broad limits by changing the volumetric flow rate pumped in the circuit. The greater the volumetric flow rate, the coarser the NaF produced. The reactants are introduced separately, preferably into the circulation line upstream or downstream of the pump.

Figure 1:
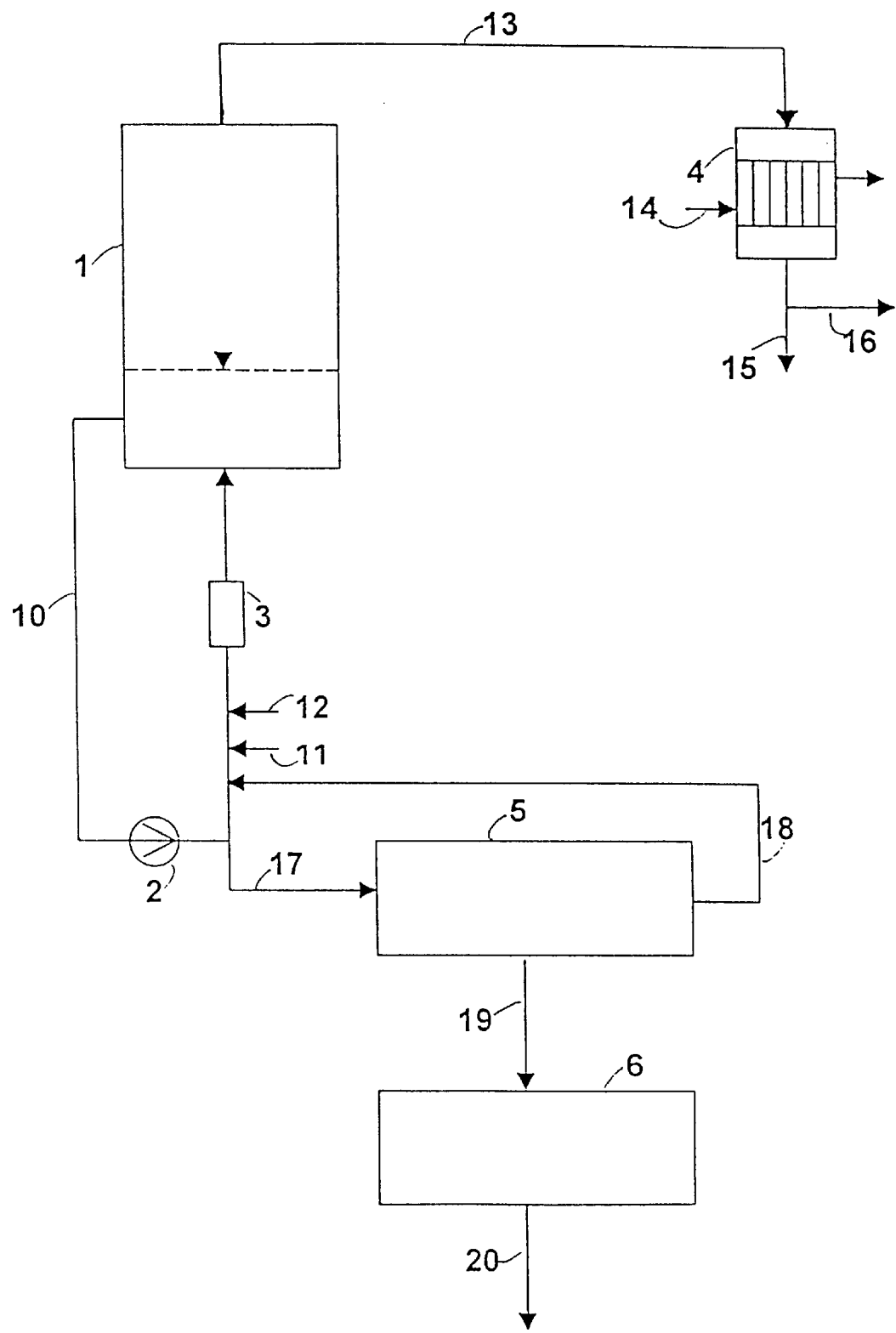
FIG. 1 depicts the process flowsheet.

The preferred embodiment of the process according to the invention is to be described in more detail with reference to FIG. 1.

The reactor for the preparation of the NaF is a vacuum force-circulation evaporator, consisting of a vapour dome (1), a circulation pump (2) and a static mixer (3) together with the associated circulation line. By means of pump (2), the suspension (10) preferably comprising 5 to 30% by weight of solid NaF is circulated at a volumetric flow rate such that the suspension, owing to the heat of reaction which is liberated in the reaction of the 50% strength by weight NaOH (11) and the hydrogen fluoride (12) fed into the circuit, is heated by 3 to 50 k, preferably 5 to 20 k. The circulated volumetric flow rate is in the range from 15 to 300 $m^3/h$, preferably 40 to 200 $m^3/h$, at a plant capacity of 1 t of NaF/h. The heat of reaction is utilized completely for evaporating water in the vapour dome (1). The water (13) evaporated under vacuum in the vapour dome (1) is condensed in the condenser (4) fed with cooling water (14). The condensate (15) is passed off as usual via an immersed tube, while noncondensible gases (16) are withdrawn from the system by a vacuum pump. The condensation temperature of the vapours is set such that the temperature of the suspension flowing from the vapour dome (1) to the pump (2) is in the range from 20 to 60° C., and preferably 30 to 50° C. The low temperature of the reaction medium, the high dilution of the reactants and the static mixer built into the circulation line avoids the formation of HF gas bubbles.

From the suspension circuit, as much suspension (17) is fed out continuously to a vacuum rotating drum filter (5) as corresponds to the NaF formation. Owing to the low temperature of the suspension, the evaporation of water from the mother liquor and thus blockage of the filter cloth by crystallization is avoided. The mother liquor (18) arising as filtrate, an approximately 4% strength by weight NaF solution, is recirculated to the reactor. The filter cake (19) is fed into a dryer (6), from which the dried pure NaF (20) is discharged.

The process according to the invention offers a plurality of advantages:
the reactants sodium hydroxide solution and hydrogen fluoride are immediately greatly diluted and well mixed in the relatively cold suspension circuit, so that no HF can escape.
The low reaction temperature makes possible the use of inexpensive plant components.
The heat of reaction is utilized completely to evaporate water, so that only a little water must be evaporated during the drying of the NaF filter cake.

The low temperature of the NaF suspension makes possible the interference-free and effective separation of the mother liquor from the NaF produced.

By changing the volumetric flow rate pumped in the circuit, within broad limits, for a given plant capacity, the fineness of the NaF produced can be set in accordance with the requirement.

The advantages of the invention are to be illustrated by the following example, without the scope of the invention being restricted thereby.

EXAMPLE 48 t/h of a suspension which comprises 18.2% by weight of solid NaF in saturated NaF solution (stream (10) in accordance with FIG. 1), are transported by pump (2). Initially 1600 kg/h of 50% strength by weight NaOH (11) and thereafter 400 kg of liquid hydrogen fluoride (12) are introduced into the partial stream returned to the vapour dome (1). Owing to the heat of reaction which is liberated in the NaF formation, the suspension heats up from 35° C. to 50° C. In the vapour dome (1), in which a pressure of 50 mbar (absolute) is maintained, the suspension cools down again to 35° C. by the evaporation of 1020 kg/h of water. The vapour condensate (15) flowing off from the condenser (4) at 32° C. comprises 40 to 60 ppm of HF. Downstream of pump (2), a partial stream (17) of the suspension (10) is taken off and passed to the vacuum rotating drum filter (5). In the filtration of this partial stream (4500 kg/h), 960 kg/h of filter cake (19) containing 14.6% by weight of moisture arise, and 3540 kg/h of mother liquor (18) arise, which flows back to the vapour dome (1).

The filter cake is dried in a spin flash dryer (6) at 180° C. From the dryer 840 kg/h of pure NaF are discharged.

What is claimed is:

1. Process for forming sodium fluoride from sodium hydroxide solution and hydrogen fluoride, wherein at least 45% strength by weight, sodium hydroxide solution and anhydrous hydrogen fluoride are introduced separately into a reactor containing a saturated NaF solution in which 4 to 50% by weight, solid NaF are suspended and the temperature of which is in the range from 20 to 80° C. forming a reaction medium.

2. Process according to claim 1, wherein the temperature is kept in the range from 20 to 80° C. by evaporating water from the reaction medium at reduced pressure.

3. Process according to claim 1, wherein after the formation of NaF, the NaF-saturated solution is separated, forming solid sodium fluoride and a mother liquor which is then recirculated to the reactor.

4. Process according to claim 1, wherein the reactor is a vacuum forced-circulation evaporator, consisting of vapour dome, circulation line, into which a static mixer is installed, as well as vapour condensation system, in which the sodium hydroxide solution and hydrogen fluoride are fed separately into the NaF solution.

5. Process according to claim 1, wherein the volumetric flow rate of the NaF saturated solution in the reactor is selected so that the heating of the NaF saturated solution due to the heat of reaction released in the NaF formation is in the range from 3 to 50 K.

6. Process according to claim 1, wherein the particle size of the NaF is increased by increasing the volumetric flow rate of the NaF saturated solution in the reactor, or is decreased by decreasing the volumetric flow rate of the NaF saturated solution.

7. Process according to claim 1, wherein, per ton of NaF production/h, the volumetric flowrate of the NaF saturated solution in the reactor is in the range from 15 to 300 m$^3$/h.

* * * * *